United States Patent [19]
Edhlund

[11] 3,722,991
[45] Mar. 27, 1973

[54] MICROFICHE POSITIONING APPARATUS

[75] Inventor: Arthur J. Edhlund, Stillwater, Minn.

[73] Assignee: Minnesota Mining and Manufacturing Company, St. Paul, Minn.

[22] Filed: May 4, 1970

[21] Appl. No.: 34,293

[52] U.S. Cl. ........................................353/27, 355/40
[51] Int. Cl. .........................G03b 23/08, G03b 25/52
[58] Field of Search ..............353/27, 25; 355/40, 43; 340/173 LM; 235/61.6 A, 61.6 B

[56] References Cited

UNITED STATES PATENTS

| | | | |
|---|---|---|---|
| 3,361,031 | 1/1968 | Stroud | 353/27 |
| 2,865,638 | 12/1958 | Acker | 274/10 D |

OTHER PUBLICATIONS

I.B.M. Technical Disclosure Bulletin, O. Nielsen, "-Selection Indicator for fiche Viewer", Vol. 10, No. 12, May 1968, p. 1870.

*Primary Examiner*—Leonard Forman
*Assistant Examiner*—Steven L. Stephan
*Attorney*—Kinney, Alexander, Sell, Steldt and Delahunt

[57] ABSTRACT

A microfiche reader/printer having a movable microfiche positioning apparatus that may be readily adjusted for accommodating the reader/printer to different microfiche formats. The positioning apparatus includes a support frame, a transport frame movable relative to the support frame along a first axis, and a microfiche carriage supported by the transport frame and movable parallel to a second axis. A first circuit board is secured to the support frame and includes first and third coded conductive patterns. A first follower, secured to the transport frame, has a first electrical contact and third electrical contact to engage the first and third coded conductive patterns. A second circuit board is secured to the transport frame and includes second and fourth coded conductive patterns. A second follower, secured to the microfiche carriage, has a second electrical contact and fourth electrical contact to engage the second and fourth coded conductive patterns. The first and second circuit boards may be readily replaced with alternative circuit boards for accommodating the microfiche reader/printer to various microfiche formats. Encoding selector buttons and binary switches electrically connected to the third and fourth coded conductive patterns provide predetermined termination of the automatic sequential copying of the microframes.

6 Claims, 8 Drawing Figures

INVENTOR.
ARTHUR J. EDHLUND
BY Kinney, Alexander, Sell, Steldt & DeLaHunt
ATTORNEYS INVENTOR.
ARTHUR J. EDHLUND
BY Kinney, Alexander, Sell, Steldt & DeLa Hunt
ATTORNEYS INVENTOR.
ARTHUR J. EDHLUND
BY Kinney, Alexander,
Sell, Steldt & De La Hunt
ATTORNEYS INVENTOR.
ARTHUR J. EDHLUND
BY Kinney, Alexander, Sell, Steldt & DeLaHunt
ATTORNEYS

MICROFICHE POSITIONING APPARATUS

BACKGROUND OF THE INVENTION

The progressively increasing number of records and reports, that must be stored for subsequent use, has necessitated the utilization of microfilm. One form of microfilming is to include a plurality of distinct microframes on a single piece of film, wherein each single film is known as a microfiche film. Thus, on one microfiche film a multipage report, wherein each page would consist of one microframe, could be photographed and recorded on a single sheet of microfiche, assuming sufficiently small microframes and a sufficiently large microfiche film. If the reader also desired to obtain a retainable copy of a desired microfiche, a microfiche reader/printer would be utilized.

Various arrangements of microframes on the microfiche film have evolved to satisfy diverse requirements, varying in number of rows, number of microframes per row, sizes of microframes, spacing between microframes, and spacing between rows. The only common characteristic in virtually all known formats is that for a multi-page document the sequence of microframes will begin at the first column and procede along one row to the last column, the sequence will continue along the second row beginning again in the first column. This sequence is repeated throughout the microfiche film.

A common user of the microfiche system is a public library wherein microfiche films are received in a variety of physical sizes and formats including varying pitch distance between the adjacent microframes. A microfiche positioning apparatus that could be readily accommodated to accept the various microfiche formats would provide an economical and practical apparatus for viewing and obtaining copies of microfiche films.

SUMMARY OF THE INVENTION

The present invention relates to a microfiche positioning apparatus having particular utility for accommodating to different microfiche formats having microframe pitch distances varying between the different microfiche formats and for sequential positioning of microframes in optical alignment with the optical axis of a microfiche reader/printer. The positioning apparatus includes a support frame, a transport frame adapted for movement along a first axis, a first follower secured to the transport frame and including a first electrical contact, a first circuit board secured to the support frame and including a first coded conductive pattern to provide various electrical connections with the first electrical contact depending upon the position of the first follower relative to the first circuit board. The positioning apparatus also includes a microfiche carriage supported by the transport frame and movable relative to the transport frame parallel to a second axis, a second follower secured to the carriage for movement with the carriage and including a second electrical contact, a second circuit board secured to the transport frame including a second coded conductive pattern to provide various electrical connections with the second electrical contact depending upon the position of the second follower relative to the second circuit board. The positioning apparatus further includes control means for controlling the sequential movement of the microfiche carriage and transport frame to sequentially position and substantially align microframes of the microfiche with the optical axis of the microfiche reader/printer.

Thus, while other schemes are known for positioning a carriage they commonly utilize relatively unchangeable machined components for locating a microfiche film within a reader/printer. One advantage of the positioning apparatus disclosed in the present embodiment is the incorporation of coded conductive patterns laminated to a rigid backing, to form a circuit board, which can be easily and inexpensively reproduced with sufficient precision. Thus, the coded conductive pattern, in cooperation with electrical contact on a follower, will provide electrical indication of the position of the microfiche relative to the optical axis of the reader/printer. For different microfiche formats wherein the pitch distance between the microframes will vary between the formats, an alternative circuit board having an alternative pattern corresponding to the microframe pitch distances of the selected microfiche, can be readily inserted into the present embodiment to accommodate the microfiche positioning apparatus to the different microfiche formats. Also, other coded conductive patterns on each circuit board can be utilized to form a series circuit and when the series circuit is electrically matched with the positioning of the plurality of the binary selector switches the automatic advancing sequence can be terminated at a predetermined location.

Other uses and many of the attendant advantages of this invention will be readily appreciated as the same becomes more fully understood by reference to the following detailed description when considered in connection with the accompanying drawings in which like numerals designate like parts throughout the figures and wherein.

Figures 7, 8:
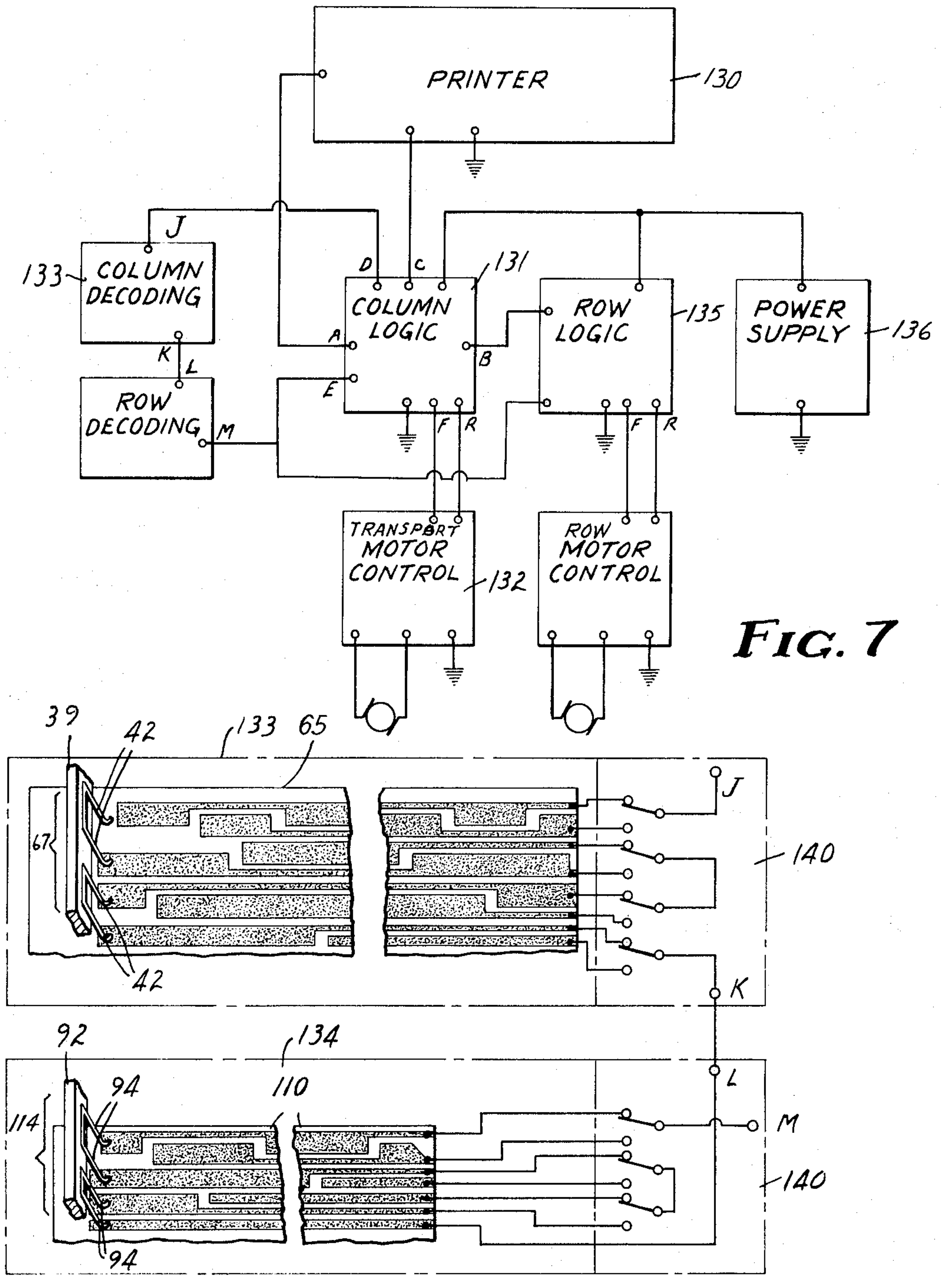

FIG. 7 is a block diagram illustrating the functional operation of the present embodiment; and FIG. 8 is a diagrammatic-schematic view illustrating the coded conductive patterns on the first and second circuit boards electrically connected to the binary selector switches to provide a completed electrical series circuit when the microfiche positioning apparatus has reached the position of a predetermined termination.

In the interest of maintaining consistent orientation of the various components disclosed in the embodiment illustrated in the drawings, the microfiche positioning apparatus 30 will move along a first axis 20 to position successive microframes 21, arranged in a row 22 on the microfiche film 23, in substantial optical alignment with the optic axis 24 of the microfiche reader/printer 10. Movement of the microfiche positioning apparatus along and parallel to the second axis 25 will position successive microframes 21, arranged in column 26 of the microfiche film 23, in substantial optical alignment with the optic axis 24 of the reader/printer 10.

Figure 1:
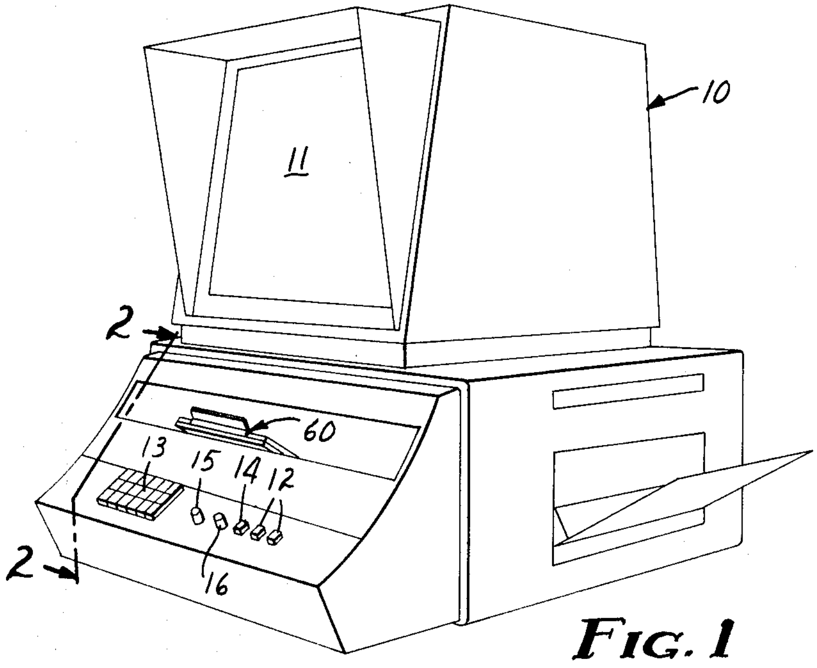
FIG. 1 is an isometric view illustrating the microfiche reader/printer of the present embodiment.

The reader/printer of FIG. 1 includes a console providing components for permitting general operation of the reader/printer 10, a viewing screen 11 for illustrating to the operator the image of the microframe 21 then currently located within the optical axis 24 of the reader/printer 10, and a printer (not shown) to provide retainable copies of desired microframes.

Generally, the operator of the microfiche reader/printer will place a desired microfiche format against stops within the microfiche clamping means 60, operate the column and row step switches 12 to properly position the first microframe on the viewing screen 11, push the selector buttons 13 to select the last microframe to be printed in the automatic printing sequence of the microfiche film 23, push the print button 14, and permit the microfiche reader/printer to print retainable copies of all microframes up to the microframe selected on the selector buttons 13. If it is desired to use a microfiche film wherein the microframe pitch distances are different from the last microfiche film used in the reader/printer 10, alternative first and second circuit boards having coded conductive patterns corresponding with the new microfiche format are quickly substituted for the existing first and second circuit boards to accommodate the microfiche reader/printer 10 to the different microfiche format. As previously described, the automatic sequential printing of the microframes again provides the operator with the desired copies. A mode selector 15 permits the reader/printer to be manually or automatically operated. The exposure control of the printer is controlled by exposure control 16.

Figure 2:
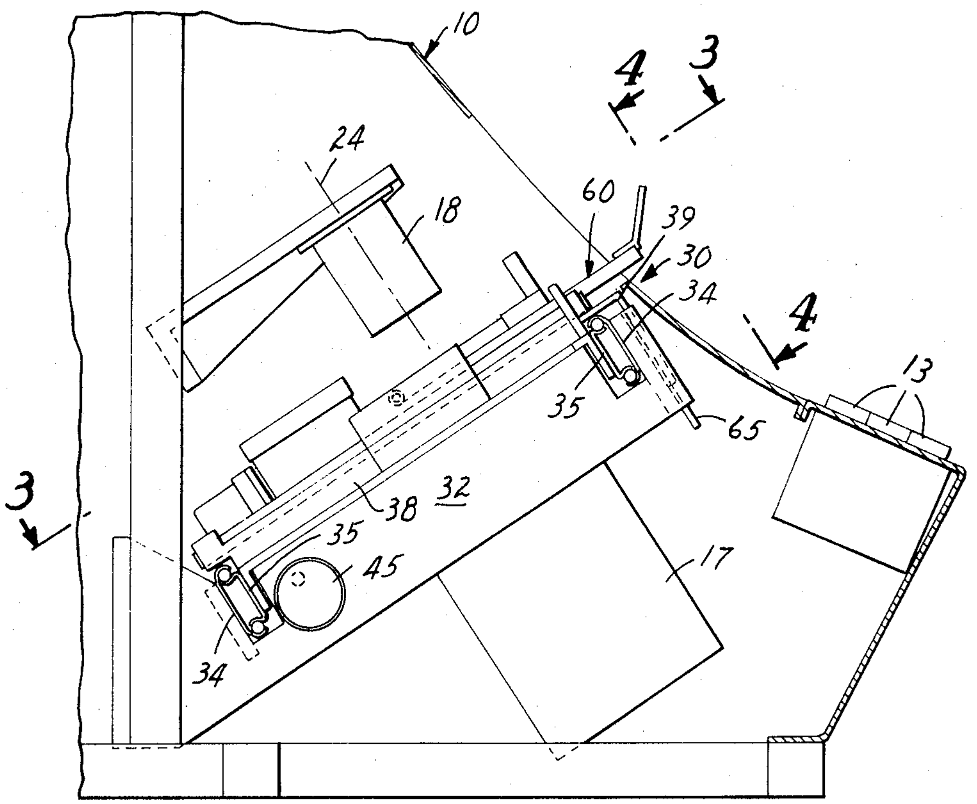
FIG. 2 is a cross-sectional view taken along lines 2—2 of FIG. 1.
Figures 3, 4:
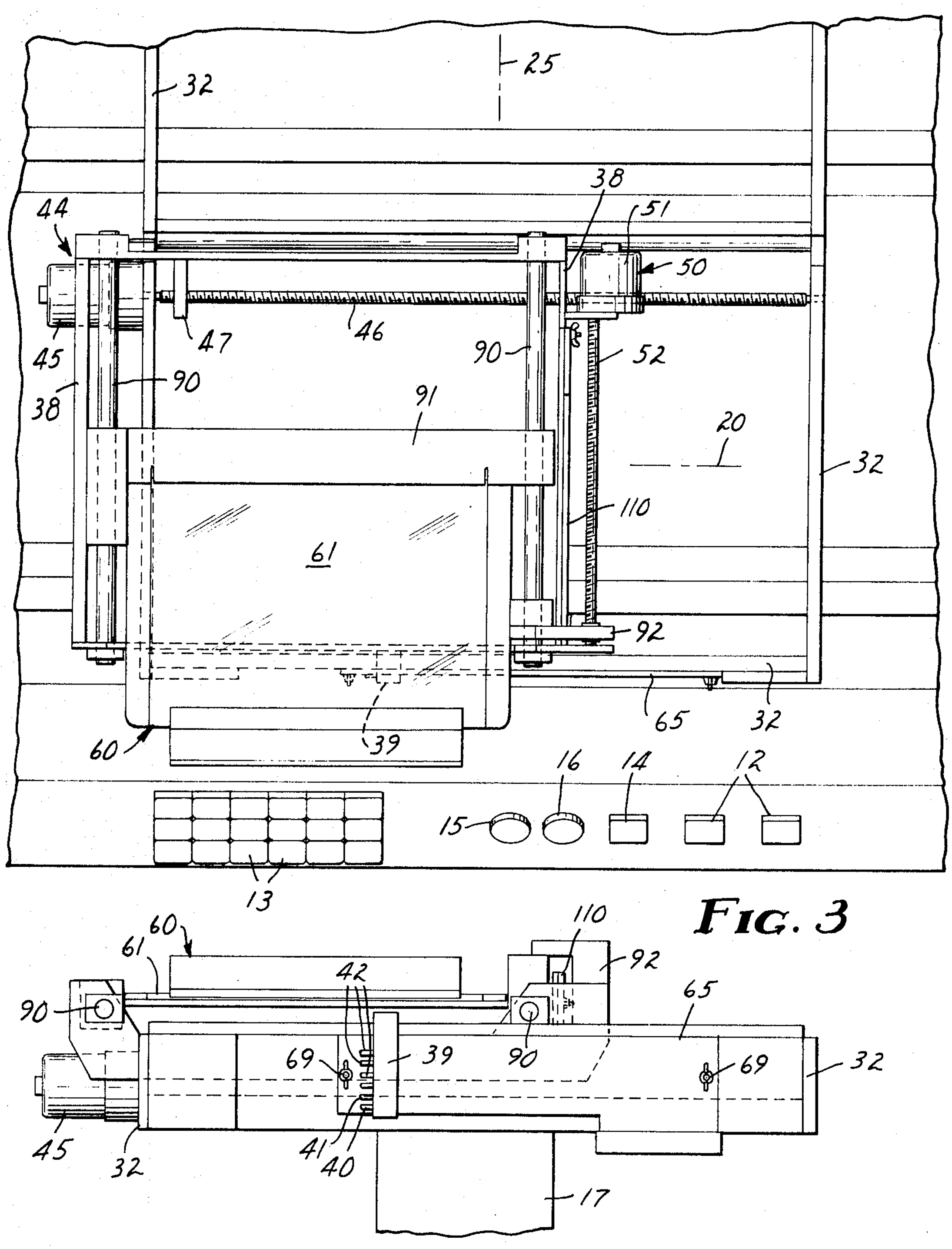
FIG. 3 is a view of the microfiche positioning apparatus taken along lines 3—3 of FIG. 2.
FIG. 4 is a view of the microfiche positioning apparatus taken along lines 4—4 of FIG. 2.
Figure 5:
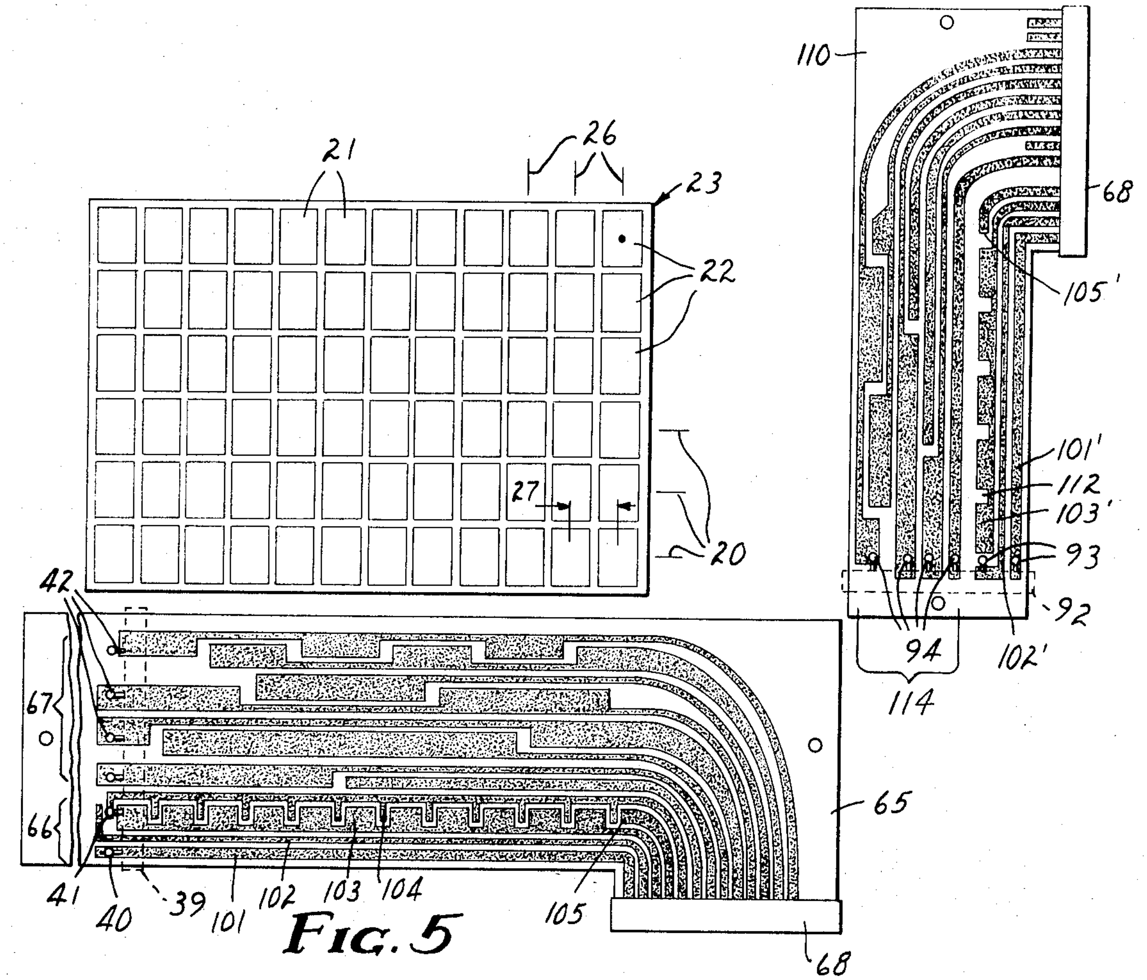
FIG. 5 is a diagrammatical view of one microfiche format illustrated with a corresponding first and second circuit board.

FIG. 2 is a side elevational view of the microfiche positioning apparatus 30 of the present embodiment taken along lines 2—2 of FIG. 1 and diagrammatically illustrates the reader/printer source of illumination 17 and the corresponding enlarging optics 18 of the reader/printer 10. As shown in FIGS. 2 and 3, a support frame 32 is adapted to be secured to the general framework of the microfiche reader/printer 10. A plurality of ball bearing slides 34 are secured to the support frame 32 and are engaged by a plurality of ball bearing followers 35 secured to a transport frame 38 to permit movement of the transport frame 38 relative to the support frame 32 along the first axis 20. A first follower 39 is secured to the transport frame 38 for movement therewith. The first follower 39 could include a pair of electrically connected first wiper bars 40, 41 similar to the wiper bars illustrated in FIG. 8, as illustrated in FIG. 5. Alternatively, the first follower 39 could include a first electrical contact 41, as a single wiper bar 41, wherein the first row conductor 101 would be replaced by directly connecting the power source to the first electrical contact 41.

A first circuit board 65, as shown in FIGS. 2, 3, 4 and 5, is secured to the support frame 32 adjacent the path of the first follower 39. The first circuit board 65 includes a first coded conductive pattern 66 to provide various electrical connections with the first electrical contact 41 depending upon the position of the first follower 39 relative to the first circuit board. The first follower 39 further includes a third electrical contact 42, illustrated as electrically interconnected wiper-bar contacts 42 in FIG. 8. Alternatively, the third electrical contact could be a single wiper bar contact. The single contact could have utility with a microfiche film having a minimal number of microframe columns. The first circuit board 65 also includes third coded 67 conductive pattern to provide various electrical connections with the third electrical contact 42, of follower 39, depending upon the position of the first follower 39 relative to the first circuit board 65. The first drive means 44 for moving the transport frame 38 along the first axis 20 to position the microfiche film 23 relative to the optical axis 24 which positioning is in response to the electrical connections provided by the first coded conductive pattern 66 on the first board 65 and the first electrical contact 41 and to afford changing of the electrical connections between the first electrical contact 41 and the first coded conductive pattern 66 on the first board 65. The first drive means includes a permanent magnet, bi-directional d/c transport motor 45 secured to the support frame 32, a threaded positioning shaft 46, and a threaded link 47 secured to the transport frame 38 for moving the transport frame 38 along the first axis 20.

As shown in FIGS. 2 and 3, guide rails 90 are secured to the transport frame 38. A microfiche carriage 91 is supported by the transport frame 38 by way of the guide rails 90 and movable relative to the transport frame 38 parallel to the second axis 25. The carriage 91 includes clamping means 60 for securing a microfiche film 23 to the carriage 91. A clamping means 60, as illustrated in the present embodiment, includes film stops (not shown) for positioning the microfiche film 23 relative to the carriage 91 and a transparent plate 61 pivotably mounted to permit the insertion and securing of the of the microfiche film 23 to the carriage 91. The second follower 92 is secured to the carriage 91 for movement therewith. The second follower 92 could include a pair of electrically connected second wiper bars 93, similar to the wiper bars illustrated in FIG. 8, as illustrated in FIG. 5. Alternatively, the second follower 92 could include a second electrical contact 92, as a single wiper bar 92, wherein the first column conductor 101' would be replaced by directly connecting the power source to the second electrical contact 92.

The second circuit board 110, secured to the transport frame 38 adjacent the path of the second follower 92, includes a second coded conductive pattern 112 to provide various electrical connections with the second electrical contact 93 depending upon the position of the second follower 92 relative to the second circuit board 110. The second follower 92 further includes a fourth electrical contact 94, illustrated as electrically interconnected wiper bars 94 in FIG. 8.

Alternatively, the fourth electrical contact 94 could be a single wiper bar contact 94. The single contact 94 could have the utility with a microfiche film 23 having a minimal number of microframe rows 20. The second circuit board also includes a fourth coded conductive pattern 114 to provide various electrical connections with the fourth electrical contact 94, depending upon the position of the second follower 92 relative to the second circuit board 110. A second drive means 50 for moving the carriage 91 parallel to the second axis 25 to position the microfiche film relative to the optical axis 24 which positioning is in response to the electrical connections provided by the second coded conductive pattern 112 on the second board 110 and the second electrical contact 93, and to afford changing of the electrical connections between the second electrical contact 93 and the second coded conductive pattern 112 on the second board 110. The second drive means 50 includes a permanent magnet, bidirectional d/c row motor secured to the transport frame 38, a threaded positioning shaft 52, and a threaded link 53 secured to the microfiche carriage 91 for moving the carriage 91 parallel to the second axis 25.

Although the present embodiment illustrates the first follower 39 secured to the transport frame 38 and the first circuit board 65 secured to the support frame 32, these components could be reversed in an alternative embodiment whereby the first circuit board 65 would be secured to a transport frame 38, movable therewith, and the first follower 39 would be secured to the support frame 32. Likewise, a still further embodiment could include the second circuit board 110 secured to the microfiche carriage 91 and the second follower 92 could be secured to the transport frame 38. Additional embodiments could include still further combinations of locating the first follower — first board relative to the second follower — second board.

Figure 6:
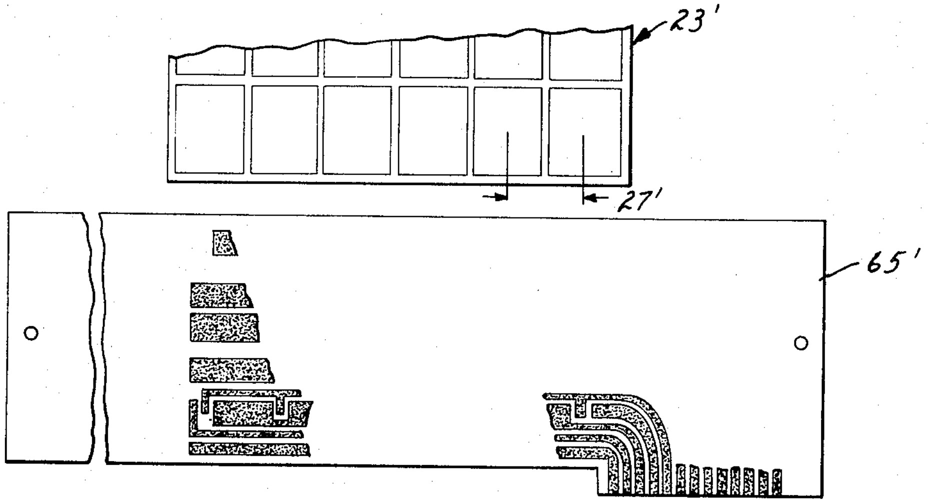
FIG. 6 is a diagrammatic view illustrating a portion of an alternative microfiche format with a corresponding first circuit board.

FIG. 6 illustrates the utilization of an alternative first circuit board 65′ correlated to an alternative microfiche film 23′ with different microframe pitch distances 27′ as compared to the microframe pitch distance 27 of FIG. 5.

In referring to FIG. 5 the first circuit board 65 is illustrated as having first and third conductive patterns 66, 67 thereon and electrical connection 68 permitting quick electrical interconnections. Wing-nuts 69, as shown in FIG. 4, provide quick physical location and connection of the first and boards 65, 110 to their respective supports. The first coded conductive pattern 66 includes a first column conductor 101, a second column conductor 102 indicating left-hand over-travel of the carriage 91, a third column connector 103 indicating continuous motor run while in transit between positions, a fourth column conductor 104 to indicate that the transport has completed the shift from one frame to the other frame and energizes the printer 130 to initiate a print, and a fifth column conductor 105 to reverse the direction of the transport motor 45. If the contact fingers 40, 41 are in the position shown in FIG. 5, contact is made between conductors 101 and 104 which serves to generate a signal A on the column logic 131 (see FIG. 7) telling the printer 130 to make a print. When the printer 130 completes making a print, a signal C (FIG. 7) is supplied which indicates to the column logic 131 that the motor 45 should commence running in a forward direction. As soon as the motor 45 runs in a forward direction it will move the contact 41 to the right and an electrical connection will be made between the conductors 101 and 103. This electrical connection serves to maintain continuous motor run in a forward direction. When the contact finger 41 has progressed so that contact 41 leaves conductor 103 and then contacts conductor 104, the motor 45 is dynamically braked to a stop by the motor control 132 (FIG. 7), another A signal is generated initiating another print. This sequence is repeated until after the last print in the row 22. The same sequence is initiated including the point when the motor 45 begins travelling to the forward direction, however, as soon as the contact 41 makes contact between conductors 101 and 105, column logic 131 serves to reverse motor 45 by changing the signal from Line F to Line R (FIG. 7). This serves to reverse the motor and the transport frame 38 transverses without stopping back to its left-hand most position, as shown in FIG. 5, during which time signal on Line A is inhibited by the column logic 131. The second circuit board 110 also includes an electrical connection 68′, a first row connector 101′, a second row connector 102′, a third row connector 103′, and a fourth row connector 105′. These connectors operate with the second electrical contact 93 to control the advancement of the row motor 51.

In referring to the block diagram of FIG. 7 in combination with schematic drawing of FIG. 8, there is illustrated the functional operation of the sequential printing and predetermined termination of the automatic printing operation of the present embodiment. FIG. 7 illustrates a printer 130 for providing retainable copies of the desired microframes 21, a column decoding 133 operation corresponding to the third coded conductive pattern 67 shown in FIG. 8, a row decoding operation 134 corresponding to the fourth coded conductive pattern 114 shown in FIG. 8, a column logic 131, a row logic 135, a power supply 136, a transport motor control 132, and a row motor control 137. The J, K, L, and M connections on the column and row decoding of FIG. 7 corresponds with the J, K, L, and M connections set forth in FIG. 8. FIG. 8 indicates the column decoding switching circuitry consisting of the third coded conductive pattern 67 on the column board 65, a set of binary switches 140 mechanically interconnected with the select buttons 13 and the row decoding switching circuitry consisting of the fourth coded conductive pattern 114 on the row board 110. The binary switches are operated by the array of manual select buttons 13 and create a specific sequence of contacts. A circuit is made through the switch contacts and the patterns on the board in the third and fourth conductive patterns respectively, and the associated contact fingers 42, 94 such that when the position of the contact fingers 42 on the column board 65 corresponds to the binary switch arrangement set by the numbered select buttons 13 button, and in addition the position of the contact fingers 94 on the row board 110 corresponds to the binary switch arrangement set by the lettered buttons 13, a single circuit is formed between terminals J and M, and only when all of these conditions are satisfied. This indicates that the carriage has moved beyond the column containing the desired last microframe and the row containing the desired last microframe and the column logic and row logic circuits 131, 135 cause their respective motor control circuits to reverse and both drives return the carriage 91 and transport frame 38 to their initial position.

What is claimed as the invention is:

1. A microfiche positioning apparatus having particular utility for accommodating to different microfiche formats having microframe pitch distances varying between the different microfiche formats and for sequential positioning of microframes in optical alignment with the optical axis of a microfiche reader/printer, said positioning apparatus comprising:

a. a support frame adapted to be secured to the microfiche reader/printer;

b. a transport frame supported by said support frame for movement relative to said support frame along a first axis;

c. a first follower secured to said transport frame for movement with said transport frame, said first follower including first electrical contact;

d. a plurality of circuit boards;

e. a first circuit board selected from said plurality of circuit boards on the basis of the microfiche to be used; said first circuit board secured to said support frame adjacent the path of said first follower, said first circuit board including a first coded conductive pattern to provide various electrical connections with said first electrical contact depending upon the position of said first follower relative to said first circuit board;

f. first drive means connected to said transport frame to move said transport frame along said first axis to position the microfiche format film relative to the optical axis and to effect changing of the electrical connections between said first electrical contact and said coded conductive pattern on said first board;

g. a microfiche carriage supported by said transport frame and movable relative to said transport frame parallel to a second axis, said carriage including means for securing a microfiche film to said carriage;

h. a second follower secured to said carriage for movement with said carriage, said second follower including second electrical contact;

i. a second circuit board selected from said plurality of circuit boards on the basis of the microfiche to be used, said second circuit board secured to said transport frame adjacent the path of said second follower, said second board including a second coded conductive pattern to provide various electrical connections with said second electrical contact depending upon the position of said second follower relative to said second circuit board;

j. second drive means connected to said carriage to move said carriage parallel to said second axis to position the microfiche format film relative to the optical axis and to effect changing of the electrical connections between said second electrical contact and said coded conductive pattern on said second board; and k. control means connected to said first and second drive means and said first and second circuit boards controlling said first and second drive means in response to said electrical connections provided by said coded conductive pattern on said first circuit board and said first electrical contact and in response to said electrical connections provided by said coded conductive pattern on said second circuit board and said second electrical contact to effect sequential movement of said transport frame along said first axis and to effect sequential movement of said microfiche carriage along said second axis to align microframes of the microfiche with the optical axis of the microfiche reader/printer.

2. A microfiche positioning apparatus according to claim 1 wherein:

a. said first coded conductive pattern on said first circuit board includes first indication means in contact with said first electrical contact for providing first electrical indications corresponding to the approximate center of each spaced microframe arranged parallel to said first axis whereby spacing of said first electrical indications will correspond with the pitch distance between the microframes arranged parallel to said first axis; and b. said second coded conductive pattern on said second circuit board includes second indication means in contact with said second electrical contact for providing second electrical indications corresponding to the approximate center of each spaced microframe arranged parallel to said second axis whereby spacing of said second electrical indications will correspond with the pitch distance between the microframes arranged parallel to said second axis.

3. A microfiche positioning apparatus according to Claim 2 including means for detachably securing said first circuit board to said support frame and means for providing quick electrical connection between said control means and said first circuit board to enable interchange of said first circuit board with another of said plurality of circuit boards to correspond with alternative microfiche formats having different microframe pitch distances parallel to said first axis.

4. A microfiche positioning apparatus according to Claim 2 including means for detachably securing said second circuit board to said transport frame and means for providing quick electrical connection between said control means and said second circuit board to enable interchange of said second circuit board with another of said plurality of circuit boards to correspond with alternative microfiche formats having different microframe pitch distances parallel to said second axis.

5. The microfiche positioning apparatus according to claim 1 wherein:

a. said first follower includes third electrical contact;

b. said first circuit board includes a third coded conductive pattern to provide various electrical connections with said third electrical contact depending upon the position of said first follower relative to said first circuit board;

c. said second follower including fourth electrical contact;

d. said second circuit board including fourth coded conductive pattern to provide various electrical connections with said fourth electrical contact depending upon the position of said second follower relative to said second circuit board; and e. encoding means including a plurality of push-buttons mechanically interconnected for selective opening and closing of a plurality of binary switches, said binary switches electrically connected with said third and fourth coded conductive patterns for providing an electrical determination when a predetermined microframe has been printed.

6. A microfiche positioning apparatus having particular utility for accommodating to different microfiche formats having microframe pitch distances varying between the different microfiche formats and for sequential positioning of microframes in optical alignment with the optical axis of a microfiche reader/printer, said positioning apparatus comprising:

a. a support frame adapted to be secured to the microfiche reader/printer;

b. a transport frame supported by said support frame for movement relative to said support frame along a first axis;

c. a first follower secured to one of said frames, said first follower including first electrical contact;

d. a plurality of circuit boards;

e. a first circuit board selected from said plurality of circuit boards on the basis of the microfiche format to be used; said first circuit board secured to the other of said frames adjacent the path of said first follower, said first circuit board including a first coded conductive pattern to provide various electrical connections with said first electrical contact depending upon the position of said first follower relative to said first circuit board;

f. first drive means connected to said transport frame to move said transport frame along said first axis to position the microfiche film relative to the optical axis and to effect changing of the electrical connections between said first electrical contact and said coded conductive pattern on said first board;

g. a microfiche carriage supported by said transport frame and movable relative to said transport frame parallel to a second axis, said carriage including means for securing a microfiche film to said carriage;

h. a second follower secured to one of said carriage and said transport frame, said second follower including second electrical contact;

i. a second circuit board selected from said plurality of circuit boards on the basis of the microfiche format to be used: said second circuit board secured to the other of said carriage and said transport frame adjacent the path of said second follower, said second board including a second coded conductive pattern to provide various electrical connections with said second electrical contact depending upon the position of said second follower relative to said second circuit board;

j. second drive means connected to said carriage to move said carriage parallel to said second axis to position the microfiche film relative to the optical axis and to effect changing of the electrical connections between said second electrical contact and said coded conductive pattern on said second board; and k. control means connected to said first and second drive means and said first and second circuit boards controlling said first and second drive means in response to said electrical connections provided by said coded conductive pattern on said first circuit board and said first electrical contact and in response to said electrical connections provided by said coded conductive pattern on said second circuit board and said second electrical contact to effect sequential movement of said transport frame along said first axis and to effect sequential movement of said microfiche carriage along said second axis to align microframes of the microfiche with the optical axis of the microfiche reader/printer.

* * * * *